United States Patent [19]
Funato

[11] Patent Number: 4,678,263
[45] Date of Patent: Jul. 7, 1987

[54] PHOTO SCANNER DEVICE
[75] Inventor: Hiroyoshi Funato, Chigasaki, Japan
[73] Assignee: Ricoh Company, Ltd., Tokyo, Japan
[21] Appl. No.: 788,528
[22] Filed: Oct. 21, 1985

Related U.S. Application Data
[63] Continuation of Ser. No. 565,817, Dec. 27, 1983, abandoned.

[30] Foreign Application Priority Data

Dec. 24, 1982 [JP] Japan ................... 57-225815

[51] Int. Cl.⁴ .................. G02B 26/10; G02B 26/08
[52] U.S. Cl. ................... 350/3.71; 350/6.1; 350/6.2
[58] Field of Search .......... 350/3.71, 6.1, 6.2, 350/6.3, 6.9; 355/8

[56] References Cited
U.S. PATENT DOCUMENTS 4,165,464  8/1979  Ikeda et al. .................. 350/6.2
4,266,846  5/1981  Ih .................................. 350/3.71
4,600,266  7/1986  Omi ............................... 350/3.71

OTHER PUBLICATIONS
Elzinga, C. D., et al, "Laser Electrophotographic Printing Technology", *IBM J. Res. Develop.*, vol. 25, No. 5, Sep. 1981, pp. 767-773.
Wyant, J. C., "Rotating Diffraction Grating Laser Beam Scanner", *Applied Optics*, vol. 14, No. 5, May, 1975, pp. 1057-1058.

*Primary Examiner*—John K. Corbin
*Assistant Examiner*—D. Edmondson
*Attorney, Agent, or Firm*—Oblon, Fisher, Spivak, McClelland & Maier

[57] ABSTRACT

A photo scanner device including a rotary disk having a plurality of holograms thereon and arranged in at least two concentric circles with respect to the axis of rotation of the disk, and a light source which generates a beam of light which is incident on the disk at a selected radial distance which may be varied so as to illuminate the holograms arranged on a selected concentric circle. The holograms on the same concentric circle each subtend the same angle from the axis, and the holograms on different concentric circles subtend different angles from the axis, thereby permitting the angle of scan to be switched by selection of the radial distance at which the beam of light is incident.

2 Claims, 5 Drawing Figures

PHOTO SCANNER DEVICE

This application is a continuation of application Ser. No. 565,817, filed Dec. 27, 1983, now abandoned.

BACKGROUND OF THE INVENTION

1. Field of the Invention

This invention relates to a photo scanner device, and particularly, to an apparatus for changing the scanning range in a hologram photo scanner device.

2. Description of the Prior Art

An apparatus for scanning a laser beam by means of a polarizer is used for a laser printer, an image signal reader or the like. In consideration of various factors, including scanning speed, ease of manufacturing and the like, attention has been directed to a scanning optical system using a hologram disk in which a plurality of hologram grids are concentrically arranged on a rotary disk.

However, in such an optical scanner device, the scanning range is determined by the angle which each hologram forms with respect to a center of rotation thereof, and the size of the image cannot be changed.

SUMMARY OF THE INVENTION

This invention utilizes the fact that with holograms of the same size, an angle formed with respect to a center axis varies with the distance from a center of rotation thereof, whereby plural rows of holograms different in angle formed with respect to the center of rotation are arranged on a one disk and on a different concentric circle.

The present invention therefore provides a photo scanner device including a rotary disk having a plurality of holograms thereon and arranged in at least two concentric circles with respect to the axis of rotation of the disk, and a light source which generates a beam of light which is incident on the disk at a selected radial distance which may be varied so as to illuminate the holograms arranged on a selected concentric circle. The holograms on the same concentric circle each subtend the same angle from the axis, and the holograms on different concentric circles subtend different angles from the axis, thereby permitting the angle of scan to be switched by selection of the radial distance at which the beam of light is incident.

DETAILED DESCRIPTION OF THE PREFERRED EMBODIMENT

Figure 1:
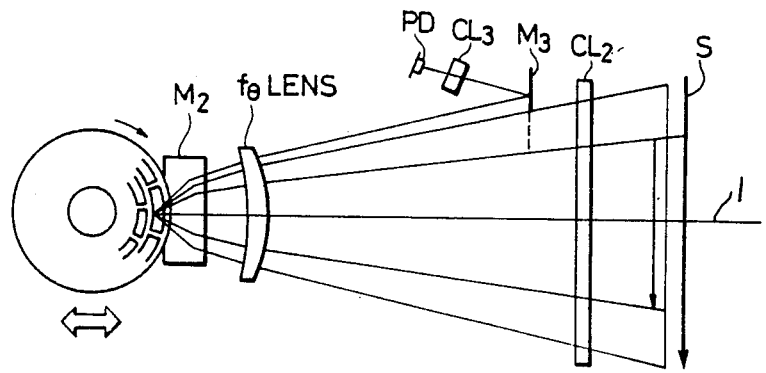
FIGS. 1 and 2 are respectively a plan view and a side view, respectively, of one embodiment of a photo scanner device in accordance with this invention.
Figure 2:
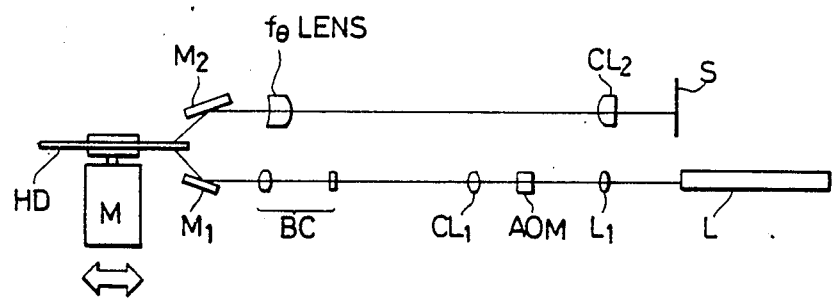

FIGS. 1 and 2 are a plan view and a side view, respectively, of one example of a photo scanner device in accordance with the present invention. An emitted beam from a laser L is condensed by a lens $L_1$ into a modulator AOM where it undergoes photo modulation depending on a signal, and thereafter the beam is incident upon a hologram disk HD via a cylindrical lens $CL_1$ having a power, a beam collimater BC and a mirror $M_1$ in a direction perpendicular to scanning, that is, in a plane of FIG. 2. The beam subjected to diffraction and deflection by the hologram on the hologram disk HD which is rotated at a constant speed in one direction forms a spot on the scanning surface S via a mirror $M_2$, an $f\theta$ lens and a cylindrical lens $CL_2$ having a power in the same direction as that of $CL_1$ and scans the surface S as the hologram disk HD rotates.

In order that the starting point for image signal modulation be the same for each scanning line, a mirror $M_3$ is placed immediately before the start end of scanning to remove a part of the scanning beam, which is detected by a photo detector PD such as a photo diode via a cylindrical lens $CL_3$ to remove a synchronous signal.

Figure 3:
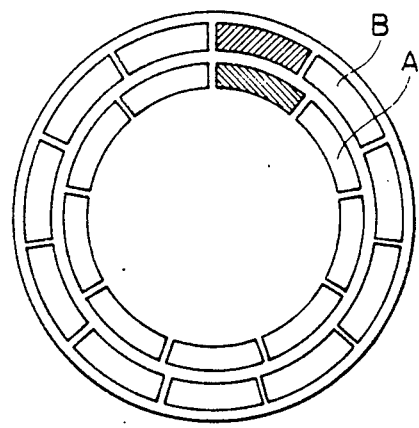
FIGS. 3 and 5 are respectively plan views showing an embodiment of another hologram disk.
Figure 4:
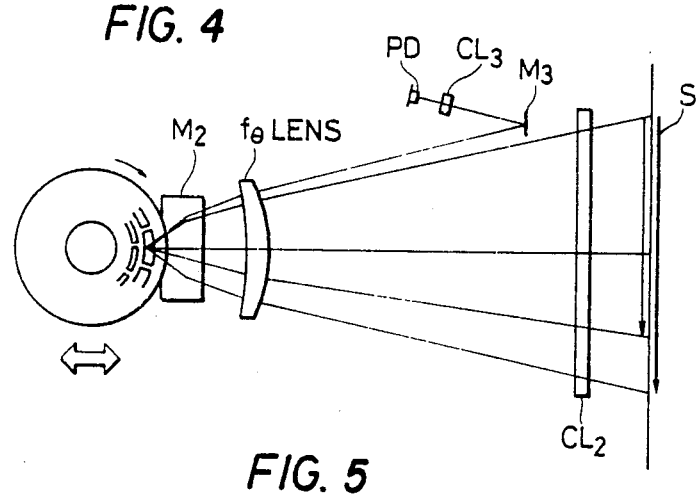
FIG. 4 is a plan view showing an optical arrangement of the photo scanner device using the same.

In the photo scanner device of the present invention, linear grids are arranged on a plurality of concentric tracks A and B different in diameter, as shown in FIG. 3. At this time, the holograms of the tracks are the same in grid pitch but the number of holograms on the concentric circle A is different from the number of holograms on the concentric circle B. The hologram disk HD is designed so that it may be moved together with a motor M in parallel in a direction of the disk surface to change incidence of the beam on the track A or on the track B.

In the optical system shown in FIGS. 1 and 2, it is now assumed that the track A was used to perform scanning. If the hologram disk HD is moved to make the beam incident upon the track B, the beam subjected to diffraction and deflection by the hologram on the track B scans the scanning surface S as in the case of scanning the track A. However, since the angle formed with respect to the center of rotation of the hologram on the track B is smaller than the hologram on the track A, the angle of overall scanning is small, and as a consequence, the length of scanning is short.

While the holograms on the tracks A and B are not always required to be same size, it will be actually convenient that the holograms of the same size are closely disposed on the respective tracks as shown in FIG. 3. In this case, the ratio of each hologram formed with respect to the center of rotation is in inverse proportion to the number of holograms on each of the tracks. Let M be the number of holograms on the track A and N be the number of holograms on the track B, the scanning width in the main scanning direction is M/N times of the case of the track A since the track used for scanning is changed from A to B.

On the other hand, if the number of revolutions the hologram disk HD and the moving speed of the recording surface in the sub-scanning direction are made to be constant, the recording length in the sub-scanning direction composed of the fixed number of scanning lines is M/N times, and the number of scanning lines per unit length of the recording surface is N/M times.

For example, where nine holograms and eleven holograms are arranged on the track A and track B, respectively, both scanning width and recording length are decreased 9/11=0.818 times by the change of track from A to B, which is the same as the reduced magnification from the size B4 to the size A4. This means that the change from B4 to A4 was made.

The number of scanning lines (resolving degree) per unit length in the sub-scanning direction is 11/9 times, and the number of overall scanning lines which form an output image is the same. The image clock also can be N/M times simultaneously with the change of track. This is achieved so as to increase the density of image elements in the main scanning direction to make the number of resolving points equal to that prior to change.

The basic construction of the present invention and operation thereof have been described but the above-described embodiment has one inconvenience. If the holograms on the tracks A and B are arranged so that the grids thereof are in parallel, the scanning thereby is in the symmetrical range about the scanning center line 1 as shown in FIG. 1, in both tracks A and B.

In such a scanning, the synchronous detection by the mirror $M_3$ and the photo detector PD may be accomplished for the track A but may not be accomplished for the track B. Thus, the synchronous detecting portion has to be moved to a position indicated by the dotted lines simultaneously with the change of the tracks A and B resulting from the movement of the hologram disk HD.

This problem can be solved by the slight change of arrangement of the holograms. That is, in the hologram disk shown in FIG. 3, a hologram on a track A and a hologram on a track B are arranged so that the directions of the respective lattices are oblique from each other through a suitable angle. With this arrangement, even the direction of deflection by the holograms on the track B is deviated and at the time of change as in FIG. 5, the synchronous detection can be made by the photo detector PD placed at a fixed position.

Figure 5:
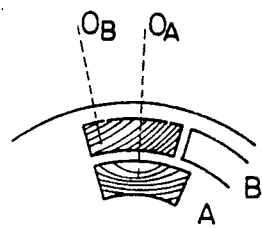

While in the foregoing, scanning by the linear grid holograms has been described, it will be noted that scanning hologram lenses are also accomplished in exactly the same manner as the former. In a hologram disk corresponding to that shown in FIG. 3, the manner wherein a hologram lens is cut is changed as shown in FIG. 5 to make directions of lenses with respect to optical axes $O_A$ and $O_B$ different from each other in both the tracks A and B.

While in the above-described embodiment, the case has been described in which a change is made to reduce the size of an output image, it should be noted that a enlargement can be made by increasing or decreasing the number of holograms on the track. It will be apparent that more than three tracks can be used for reduction and enlargement in more than two stages.

Moreover, when the diameter of the scanning beam is desired to be changed simultaneously when magnification is changed, the beam collimater BC of FIG. 2 can be replaced simultaneously with the change of a track to change a diameter of a beam incident upon the holograms. It is needless to say that a reflecting type hologram can be used instead of a penetrating type holgram.

As described above, in the present invention, change in magnification can be carried out extremely easily, which has been impossible by the conventional scanner of this kind, while using the same number of revolutions of the disk and the same feed speed of the recording member, merely by increasing the row of holograms on the hologram disk.

Furthermore, the present invention offers the excellent effect in that even in case of change in magnification, the resolving degree of the image can be maintained constant merely by additionally changing the image clock.

What is claimed is:

1. A photo scanner device comprising:
a rotary disk having a plurality of holograms thereon and arranged in at least two concentric circles with respect to the axis of rotation of said disk;
a light source which generates a beam of light which is incident on the disk at a selected radial distance which may be varied so as to illuminate the holograms arranged on a selected concentric circle;
the holograms on the same concentric circle each subtending the same angle from said axis;
the holograms on different concentric circles subtending different angles from said axis, thereby permitting the angle of scan to be switched by selection of the radial distance at which said beam of light is incident;
the holograms at the same radial distance from the axis of rotation each having substantially the same grid direction; and
the holograms at different radial directions having different grid directions so that a scanning start point is the same irrespective of the difference in scanning angle caused by the holograms at different radial distances subtending different angles from the axis.

2. A photo scanner device according to claim 1, characterized in that the hologram rows to make the illuminating light incident are selected and an image clock is varied to maintain a constant image resolution.

* * * * *